United States Patent
Borkar

(10) Patent No.: US 10,950,243 B2
(45) Date of Patent: Mar. 16, 2021

(54) METHOD FOR REDUCED COMPUTATION OF T-MATRIX TRAINING FOR SPEAKER RECOGNITION

(71) Applicant: ILLUMA Labs Inc., Plano, TX (US)

(72) Inventor: Milind Borkar, Plano, TX (US)

(73) Assignee: ILLUMA Labs Inc., Plano, TX (US)

( * ) Notice: Subject to any disclaimer, the term of this patent is extended or adjusted under 35 U.S.C. 154(b) by 98 days.

(21) Appl. No.: 16/290,399

(22) Filed: Mar. 1, 2019

(65) Prior Publication Data

US 2019/0198025 A1    Jun. 27, 2019

Related U.S. Application Data

(63) Continuation-in-part of application No. 16/203,077, filed on Nov. 28, 2018.

(60) Provisional application No. 62/638,086, filed on Mar. 3, 2018, provisional application No. 62/592,156, filed on Nov. 29, 2017.

(51) Int. Cl.
*G10L 17/04* (2013.01)
*G10L 17/02* (2013.01)

(52) U.S. Cl.
CPC .............. *G10L 17/04* (2013.01); *G10L 17/02* (2013.01)

(58) Field of Classification Search
None
See application file for complete search history.

(56) References Cited

U.S. PATENT DOCUMENTS

| 9,208,777 | B2 | 12/2015 | Yao et al. |
| 9,491,167 | B2 | 11/2016 | Talhami et al. |
| 9,626,971 | B2* | 4/2017 | Rodriguez .............. G10L 17/24 |
| 10,074,089 | B1 | 9/2018 | Rangaraj et al. |
| 10,198,319 | B1* | 2/2019 | Sieklucki ............ G06F 11/1076 |
| 2002/0147588 | A1 | 10/2002 | Davis et al. |
| 2007/0071206 | A1 | 3/2007 | Gainsboro et al. |
| 2007/0198257 | A1* | 8/2007 | Zhang ..................... G10L 17/20 |
| | | | 704/233 |
| 2007/0277151 | A1* | 11/2007 | Brunel ..................... G06F 8/10 |
| | | | 717/113 |
| 2014/0214417 | A1* | 7/2014 | Wang ..................... G10L 17/04 |
| | | | 704/232 |

(Continued)

OTHER PUBLICATIONS

Reynolds, et. al., "Robust Text-Independent Speaker Identification Using Gaussian Mixture Speaker Models", IEEE Transaction on Speech and Audio Processing, vol. 3, No. 1, Jan. 1995, pp. 72-83.

*Primary Examiner* — Douglas Godbold
(74) *Attorney, Agent, or Firm* — M&B IP Analysts, LLC

(57) ABSTRACT

A system and method for improving T-matrix training for speaker recognition are provided. The method includes receiving an audio input, divisible into a plurality of audio frames, wherein at least a first audio frame includes an audio sample of a human speaker, the sample having a length above a first threshold; generating for each audio frame a feature vector; generating for a first plurality of feature vectors centered statistics of at least a zero order and a first order; generating a first i-vector, the first i-vector representing the human speaker; generating an optimized T-matrix training sequence computation, based on the first i-vector, an initialized T-matrix, the centered statistics, and a Gaussian mixture model (GMM) of a trained universal background model (UBM).

15 Claims, 8 Drawing Sheets

(56) References Cited

U.S. PATENT DOCUMENTS

| | | |
|---|---|---|
| 2014/0214420 A1* | 7/2014 | Yao ................ G10L 15/063 704/243 |
| 2014/0222428 A1* | 8/2014 | Cumani .............. G10L 17/02 704/250 |
| 2015/0058015 A1* | 2/2015 | Mitsufuji ............ G10L 21/003 704/243 |
| 2016/0042739 A1 | 2/2016 | Cumani et al. |
| 2016/0093304 A1 | 3/2016 | Kim et al. |
| 2017/0069313 A1* | 3/2017 | Aronowitz ............ G10L 19/02 |
| 2017/0169815 A1* | 6/2017 | Zhan .................... G10L 15/14 |
| 2017/0236520 A1* | 8/2017 | Borgstrom ............ G10L 17/04 704/239 |
| 2017/0351487 A1* | 12/2017 | Aviles-Casco Vaquero ............... G10L 17/005 |
| 2017/0372706 A1 | 12/2017 | Shepstone et al. |
| 2018/0166067 A1* | 6/2018 | Dimitriadis ............ G10L 25/78 |
| 2018/0233140 A1* | 8/2018 | Koishida ............ G06K 9/00295 |
| 2019/0005962 A1* | 1/2019 | Mart nez Gonz lez .................... G06F 3/167 |
| 2019/0013013 A1* | 1/2019 | McLaren ................ G10L 15/063 |
| 2019/0080697 A1* | 3/2019 | Grancharov ............ G10L 17/20 |
| 2019/0130172 A1* | 5/2019 | Zhong ................ G06K 9/00268 |
| 2019/0304470 A1* | 10/2019 | Ghaemmaghami ..... G10L 17/06 |

* cited by examiner

METHOD FOR REDUCED COMPUTATION OF T-MATRIX TRAINING FOR SPEAKER RECOGNITION

CROSS-REFERENCE TO RELATED APPLICATIONS

This application claims the benefit of U.S. Provisional Application No. 62/638,086 filed on Mar. 3, 2018. This application is also a continuation-in-part of U.S. Non-Provisional application Ser. No. 16/203,077 filed on Nov. 28, 2018 which claims the benefit of U.S. Provisional Application No. 62/592,156 filed on Nov. 29, 2017, the contents of which are hereby incorporated by reference.

TECHNICAL FIELD

The present disclosure relates generally to automatic speaker recognition systems and particularly to improved processing in automatic speaker recognition.

BACKGROUND

With an ever increasing use of voice technologies, speaker recognition and speech recognition are two fields of technology which are gaining rapid adoption due to various technological improvements. Various methods of voice recognition have been implemented in current devices, including Gaussian Mixture Models (GMM), which are models of probability distribution of continuous measurements in biometric systems, such as speaker or speech recognition systems. Typically, employing this modeling technique is resource intensive, requiring significant processor power and memory. While improvements to hardware have allowed for implementation of GMM in its current state, improving the efficiency of resource use would reduce computation time, memory usage, and the like, allowing for current devices to process more information faster without requiring additional hardware resources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for improving T-matrix training for speaker recognition. The method comprises receiving an audio input, divisible into a plurality of audio frames, wherein at least a first audio frame includes an audio sample of a human speaker, the sample having a length above a first threshold; generating for each audio frame a feature vector; generating for a first plurality of feature vectors centered statistics of at least a zero order and a first order; generating a first i-vector, the first i-vector representing the human speaker; generating an optimized T-matrix training sequence computation, based on the first i-vector, an initialized T-matrix, the centered statistics, and a Gaussian mixture model (GMM) of a trained universal background model (UBM).

Certain embodiments disclosed herein include a system for improving T-matrix training for speaker recognition comprising: a processing circuitry; and a memory, the memory containing instructions that, when executed by the processing circuitry, configure the system to: receive an audio input, divisible into a plurality of audio frames, wherein at least a first audio frame includes an audio sample of a human speaker, the sample having a length above a first threshold; generate for each audio frame a feature vector; generate for a first plurality of feature vectors centered statistics of at least a zero order and a first order; generate a first i-vector, the first i-vector representing the human speaker; generate an optimized T-matrix training sequence computation, based on the first i-vector, an initialized T-matrix, the centered statistics, and a Gaussian mixture model (GMM) of a trained universal background model (UBM).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
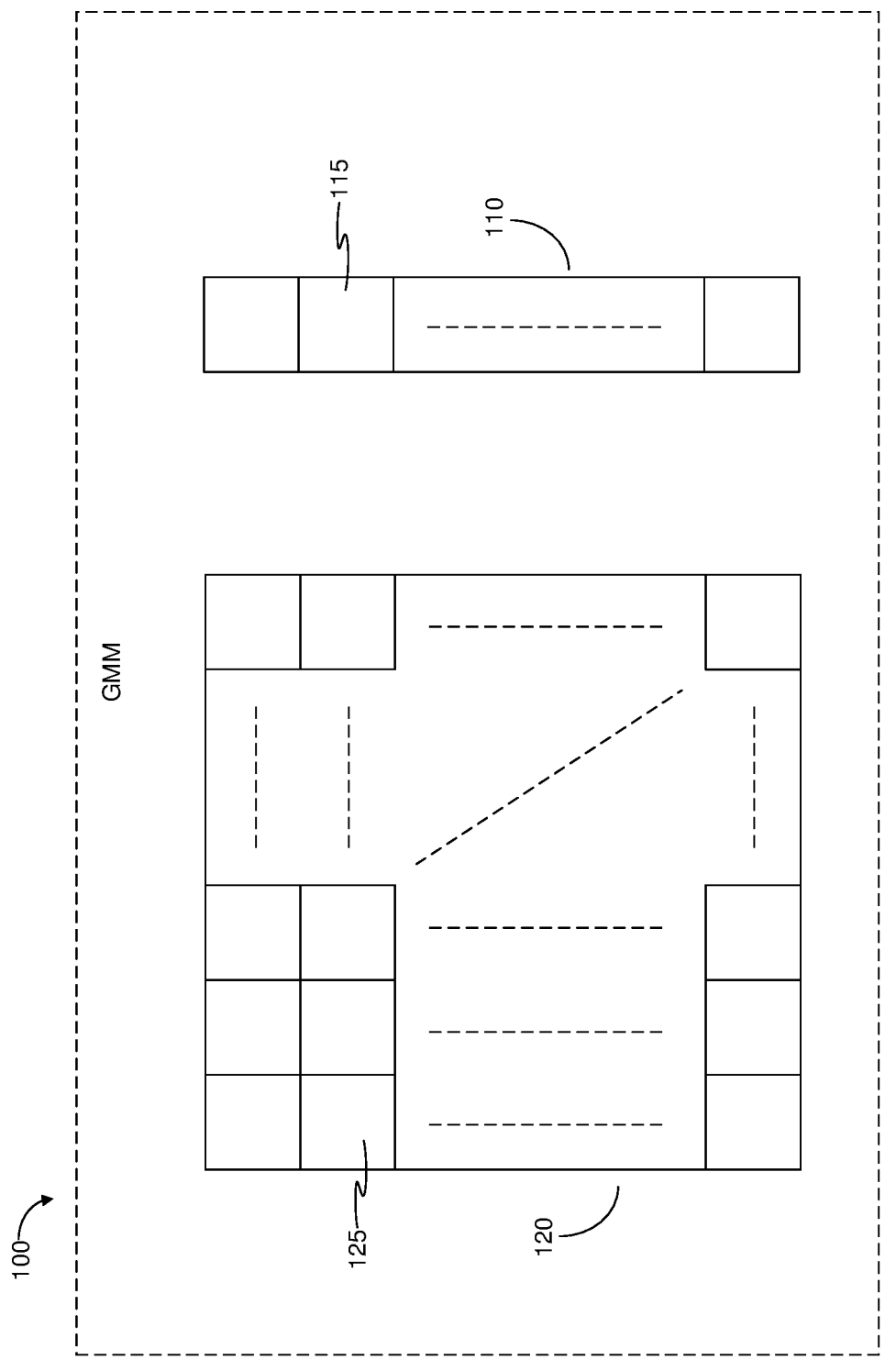
FIG. 1 is an example schematic illustration of a Gaussian Mixture Model (GMM), according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A trained T-matrix is required for speaker recognition system utilizing a universal background model (UBM). Training a T-matrix may be a resource intensive process. According to some example embodiments, a training optimizer is disclosed to improve the computational process and decrease the amount of resources required to perform such training. The trained T-matrix may then be used to generate i-vectors for speaker recognition.

FIG. 1 is an example schematic illustration of a Gaussian Mixture Model (GMM) 100 according to an embodiment. A GMM 100 is a weighted sum of 'n' component densities, where 'n' is an integer equal to or greater than 1, which may be represented by the following equation:

$$p(\vec{x} \mid \lambda) = \sum_{i}^{n} w_i f_i(\vec{x})$$

where $\vec{x}$ is a vector of D dimension, $f_i(\vec{x})$ are component densities, and $w_i$ are mixture weights. Each component density can be represented as a function, for example as the following equation:

$$f_i(\vec{x}) = \frac{1}{(2\pi)^{\frac{D}{2}} |\Sigma_i|^{\frac{1}{2}}} e^{\left\{-\frac{1}{2}(\vec{x}-\vec{\mu}_i)' \Sigma_i^{-1} (\vec{x}-\vec{\mu}_i)\right\}}$$

where $\vec{\mu}_i$ is a mean vector and $\Sigma_i$ is a covariance matrix. The mean vectors, weights and covariance matrices are all parameters of a GMM.

The GMM 100 may be stored as a data structure for computer processing. In some embodiments, a weight vector that controls each component density may be implemented. For example, a mean vector 'i' 110 may be stored as an array of 1 by D cells, where each cell, such as cell 115, holds a specific value (such as an integer, floating point, and the like). Likewise, a covariance matrix 'i' 120 may be stored as an array of 'D' by 'D' cells, such as cell 125, where each cell holds a specific value (such as integers, floating point, and the like), where D is the dimension, i.e., number of coefficients, and 'i' is one of the 'n' GMM components.

A GMM 100 may have a covariance matrix for each component, i.e., for every i of $w_i f_i(\vec{x})$), one covariance matrix per speaker model, or a single covariance matrix for the whole GMM 100. The covariance matrix 120 may be full or diagonal. In certain embodiments, a covariance matrix including only diagonal elements may be stored in memory as a vector, in order to decrease memory usage.

A speaker λ may be represented by the above parameters, i.e., mean vectors, weights and covariance matrices, or by changes thereto (i.e. related delta vectors or matrices). A GMM 100 may be used as a Universal Background Model (UBM) for speaker recognition. However, in order to properly identify speakers, the UBM must be trained with a dataset. A trained model is configured to estimate the parameters of λ which are a best match of the distribution of the training feature matrices. An example of a technique for estimating the parameters of a GMM is the maximum likelihood (ML) estimation. For a sequence of T training vectors $X = \{\vec{x}_1, \ldots, \vec{x}_T\}$ the GMM likelihood can be expressed as follows:

$$p(X \mid \lambda) = \prod_{t=1}^{T} p(\vec{x}_t \mid \lambda)$$

which is a nonlinear function and therefore direct maximization is not possible. ML parameters can, however, be obtained by the expectation-maximization (EM) algorithm.

The EM algorithm is iterative, and the following equations may be used:

Mixture Weights:

$$\overline{w}_i = \frac{1}{T} \sum_{t=1}^{T} p(i \mid \vec{x}_t, \lambda)$$

Means:

$$\vec{\overline{\mu}}_i = \frac{\sum_{t=1}^{T} p(i \mid \vec{x}_t, \lambda) \vec{x}_t}{\sum_{t=1}^{T} p(i \mid \vec{x}_t, \lambda)}$$

Variances:

$$\overline{\sigma}_i^2 = \frac{\sum_{t=1}^{T} p(i \mid \vec{x}_t, \lambda) x_t^2}{\sum_{t=1}^{T} p(i \mid \vec{x}_t, \lambda)} - \overline{\mu}_i^2$$

where a posteriori probability for acoustic class i is given by:

$$p(i \mid \vec{x}_t, \lambda) = \frac{w_i b_i(\vec{x}_t)}{\sum_{k=1}^{M} w_k b_k(\vec{x}_t)}$$

Figure 2:
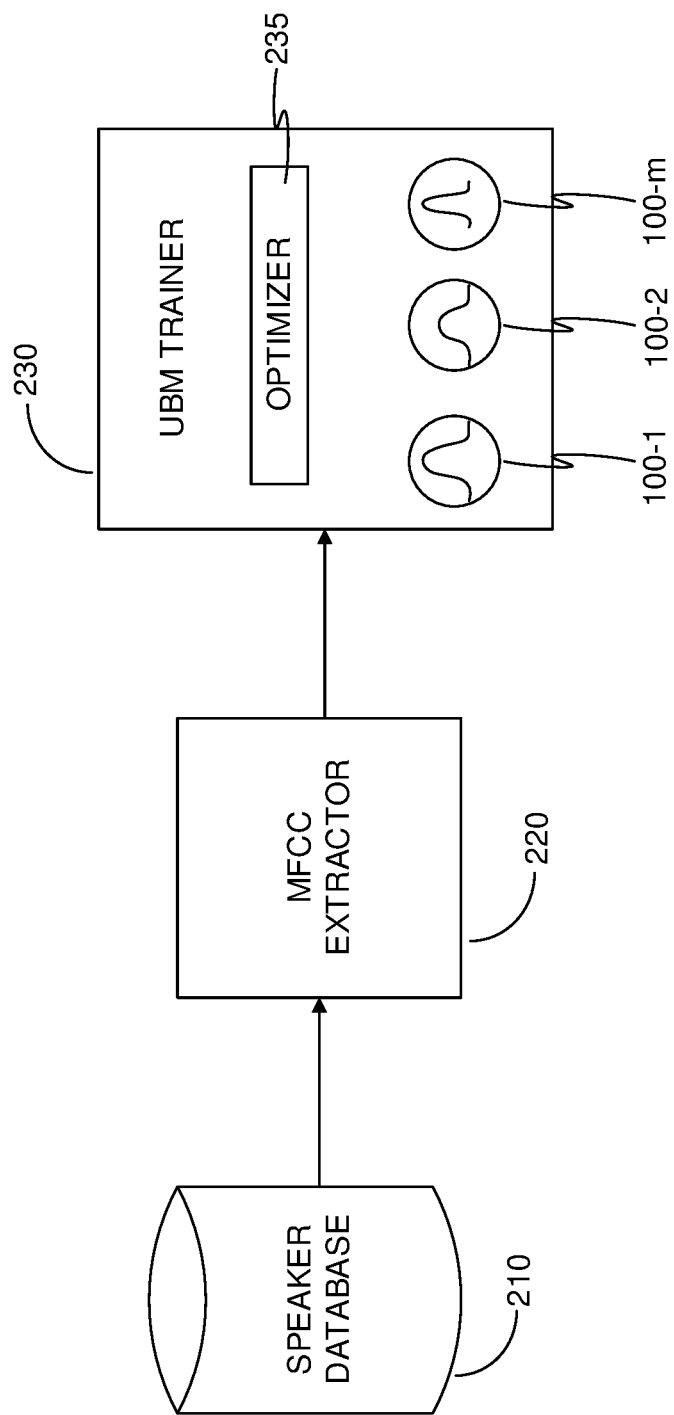
FIG. 2 is an example block diagram of a UBM trainer for training GMMs of a Universal Background Model, according to an embodiment.

FIG. 2 is an example block diagram of a UBM trainer 200 for training GMMs of a Universal Background Model, according to an embodiment. A speaker database 210 provides a training set of audio samples. Preferably the audio samples include a diverse sample group. A diverse sample group may include male and female speakers, speech over narrowband phone lines, high quality wideband speech, voice over IP (VoIP) samples, background noise, channel noise, and the like.

A feature extractor 220 is connected to the speaker database 210. The feature extractor 220 is configured to extract voice-related features from an audio sample (also referred to as audio signal herein). In one exemplary embodiment, the feature extractor 220 is configured to extract mel-frequency cepstral coefficients (MFCCs). The mel scale is a perceptual scale of pitches which to human listeners sound as being of equal distance from one another. The mel frequency cepstrum is a representation of the short-term power spectrum of a sound sample, based on a linear cosine transform of a log power spectrum on a nonlinear mel scale of frequency. The MFC coefficients therefore, are derived from a cepstral representation of a sound (or voice) sample.

In an embodiment, MFCCs are derived by computing, for a section of an audio signal (e.g., a 50 millisecond time window), the Fourier transform of an audio signal. Using triangular overlapping windows, a map is generated of the powers of the spectrum of the audio signal onto the mel scale. A logarithm of the powers at each mel frequency is then computed, and a discrete cosine transform is generated for the mel logarithm powers, where the MFC coefficients are the amplitudes of the resulting spectrum. A cepstrum is the result of computing an inverse Fourier transform of the logarithm of the estimated spectrum of a signal, in this case an audio signal.

The feature extractor 220, also referred as MFCC extractor 220, may generate MFC coefficients by receiving an audio signal from the speaker database 210, performing a computation for generating the MFC coefficients (e.g., as described above with partially overlapping frames), and storing them to a storage or memory device, e.g., in a matrix form. In some embodiments, additional coefficients may be generated as delta coefficients (and delta-delta coefficients, which are a derivative of delta coefficients), which capture the rate of change in MFCCs of consecutive audio frames (which may or may not overlap). In yet another example, the feature extractor may include a neural network which receives an audio frame as an input, and outputs a vector of 'D' features, each feature significant of the audio frame.

A UBM trainer 230 is configured to receive the MFCC vectors and uses them as a training input for one or more GMMs, such as GMM 100-1 through 100-$m$ (where 'm' is an integer equal to or greater than 2), stored therein. In an embodiment, the UBM trainer 230 includes a resource optimizer 235, discussed in more detail with respect to FIG. 4. The speaker database 210, feature extractor 220, and UBM trainer 230 may be implemented as one or more computer devices, communicatively coupled with each other, so that the feature extractor 220 is coupled with both the speaker database 210 and the UBM trainer 230.

Figure 3:
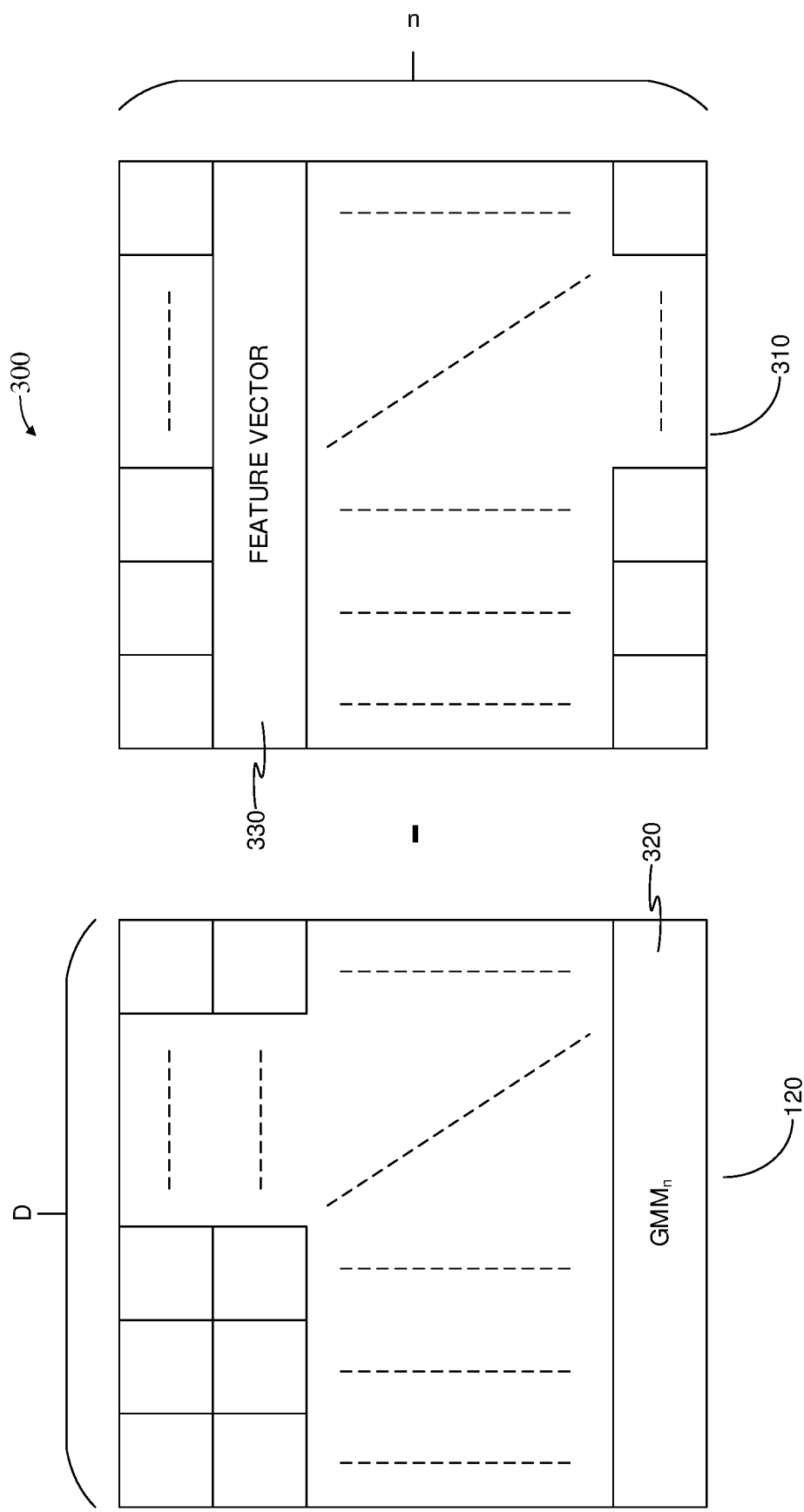
FIG. 3 is a schematic illustration of a matrix of a GMM means and an exemplary MFCC matrix used for training a UBM, according to an embodiment.

FIG. 3 is a schematic illustration of a matrix of a GMM means and an exemplary MFCC matrix used for training a UBM according to an embodiment. A UBM trainer, e.g., UBM trainer 230 of FIG. 2, may receive 'n' 'D' by 'D' GMM component covariance matrices (or an 'n' by 'D' matrix of GMM component variances, in case of diagonal covariance matrices), an 'n' by 'D' matrix of GMM component means 120, an 'n' by '1' vector of GMM component weights, a generated '1' by 'D' feature vector 330, and/or a generated 'T' by 'D' matrix of a plurality of feature vectors, as an input, where 'T' is the number of audio frames.

In order to train a UBM, each GMM component means is compared to each feature vector (e.g., MFCC vector) to generate a delta vector. A computation is then performed between the delta vector, inverse covariance matrix, and a Hermitian transposed delta vector. The result of the computation may be scaled with an associated GMM component weight vector. This step is repeated for every combination of GMM component means and each feature vector extracted from each of the audio frames, which may be overlapping in some embodiments, or a combination of overlapping and non-overlapping audio frames. The UBM trainer may then use these computations to update each of the GMM components (weights, means and covariances).

Such computations are resource intensive, using processor power and memory. Additionally, often they involve performing redundant computations, non-impact computations (always equal to zero, for example), and the like. Optimizing these computations is therefore beneficial and provides advantages in generating a robust speaker recognition model.

As discussed in more detail below, and in order to decrease computational time, a matrix of GMM component means may be generated, having a dimension of 'n' (number of GMM components) by 'D' (number of dimensions). For each audio frame, a matrix of 'n' by 'D' may be generated, by replicating each MFCC vector (a vector having 'D' elements) 'n' times. A delta matrix is then generated between each MFCC matrix (per frame) and GMM component mean matrix. In this exemplary schematic illustration, the UBM trainer 230 compares the duplicated feature vector, such as feature vector 330 to each GMM component mean, such as GMM component 320, to generate a delta matrix. A product is generated from the delta matrix, the inverse covariance matrix, and Hermitian transposed delta matrix used to generate an updated mean vector of the GMM, and in some embodiments, an updated covariance and/or updated weight vector.

Figure 4:
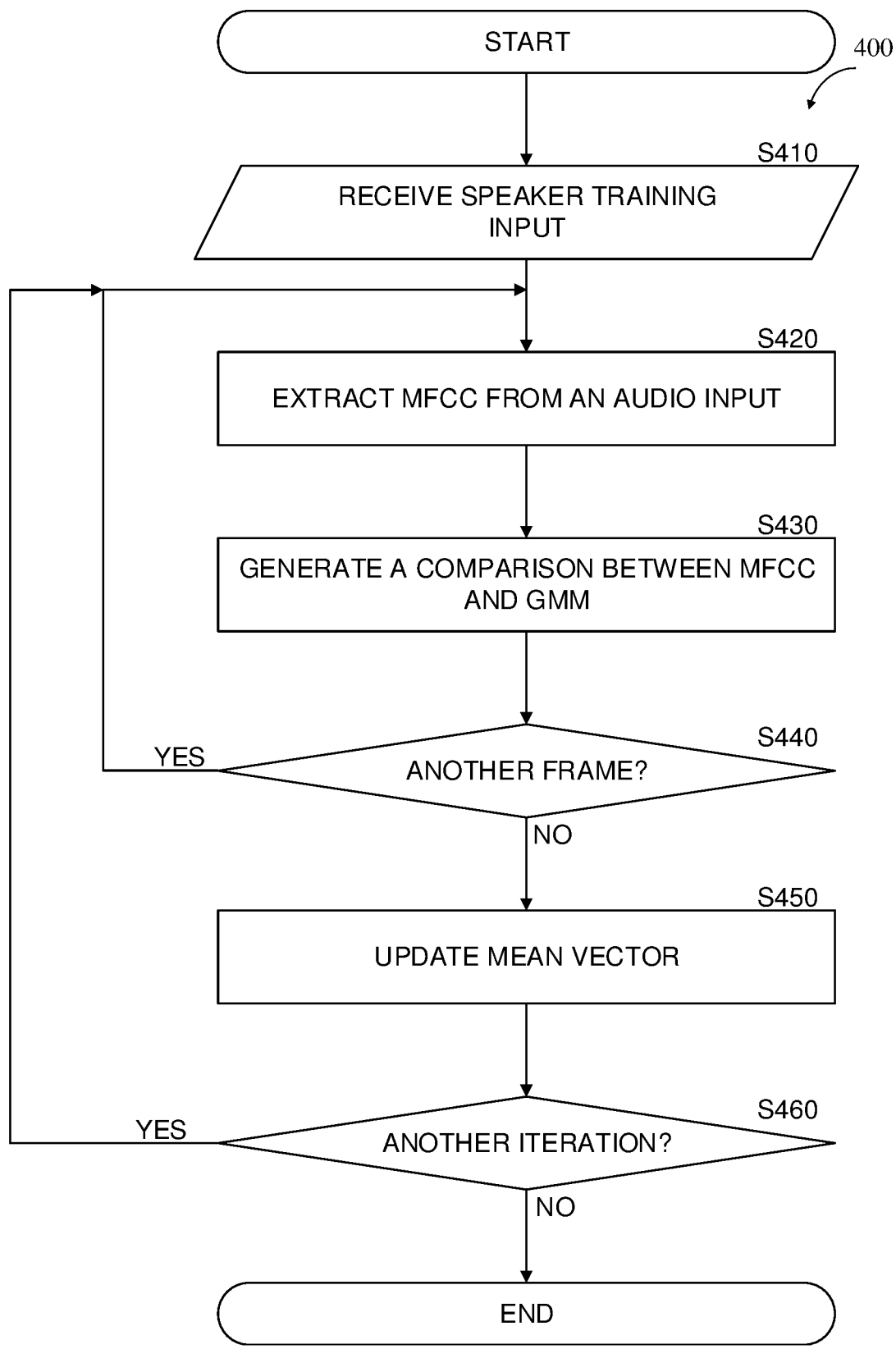
FIG. 4 is an example flowchart of a method for training a universal background model for speaker recognition, according to an embodiment.

FIG. 4 is an example flowchart 400 of a method for training a universal background model for speaker recognition, according to an embodiment. In one embodiment, the UBM trainer and feature extractor are implemented as a single machine.

At S410, an audio input is received, e.g., by a UBM trainer, such as UBM trainer 230 of FIG. 2. The audio input includes at least an audio sample, e.g., of a human speaker, the sample having a length above a threshold. A sample which is too short may not contain enough information therein to have significant input on the GMM, and may therefore be excluded.

At S420, a feature vector is generated, for example by extracting at least one audio feature. In an embodiment, an MFCC extractor is used, where MFC coefficients are generated from the audio input, and stored in a matrix data structure, as detailed throughout this disclosure. In this embodiment the feature extractor used to generate the feature vector is an MFCC extractor for pedagogical purposes only, and it is understood by those skilled in the art that other feature extractors may be used without departing from the scope of this disclosure.

At S430, a comparison (e.g., a delta) is generated between a generated MFCC matrix and a matrix of GMM component means. The MFCC matrix may include an MFCC vector duplicated to 'n' rows (where 'n' is the number of GMM components) which is compared (per frame) with a plurality of GMM components. The GMM components may include weights, means and covariances.

At S440, a check is performed to determine if another frame should be processed. In some embodiments, a plurality of frames are processed for each audio input. In certain embodiments, the plurality of audio frames include some overlap, the amount of which may be predefined. If an additional frame, which may be a consecutive frame, is to be processed, execution continues at S420; otherwise execution continues at S450.

At S450, a mean vector associated with the covariance matrix is updated based on the generated comparisons of S430. The updated mean vector may be stored in place of the previous mean vector. In some embodiments, the weights and covariances may also be updated based on the generated comparison.

At S460, a check is performed to determine if another training iteration should be processed, e.g., by the UBM trainer. If so, execution continues at S410; otherwise execution ends.

Typically, a plurality of audio inputs related to a diverse speaker population are selected, and these audio inputs are used for training the UBM in multiple iterations. This method of training a UBM may be resource intensive. To overcome this, at S430 the UBM trainer may select a resource optimizer. A resource optimizer may initiate a first optimization by instructing the processor to generate any product of the covariance matrix (e.g., multiplying the delta matrix and inverse covariance matrix), by eliminating the diagonal covariance matrix data structure. Rather than instructing a processor of the UBM trainer to process the product of two matrixes in a naïve manner, the resource optimizer may instruct the processor to only compute those values where the diagonal elements of the covariance matrix are involved. Thus, the processor avoids performing a plurality of calculations which would merely yield a zero result. By avoiding processing these data values, the UBM trainer uses less processor resources, and less memory is required to generate intermediate computations and store results, as only meaningful (e.g. non-zero) results are stored.

In some embodiments, the resource optimizer may initiate a second optimization. While one approach involves comparing each MFCC frame, usually via a loop structure (such as a "for" loop) with a plurality of GMMs, such that each instance of the loop generates a comparison between a single one of the GMM components to the current MFCC frame, this can be resource intensive. A second optimization may include generating new data structures comprising a plurality of GMM components, also referred to as a multi-dimensional data array. The multi-dimensional data arrays may include two or more of the GMM components. Such data structures may be of a data size of 'n' by '1' for GMM weights, and 'n' by 'D' for GMM means and covariances, where 'n' is an integer equal to the number of GMM components, and 'D' is an integer equal to the number of coefficients in each MFCC frame. The resource optimizer may then instruct the processor to execute necessary computations between the multi-dimensional data arrays, and a MFCC matrix generated by replicating the current MFCC vector (relating to a single audio frame) in a 'n' by 'D' matrix.

In certain computing environments, this single cycle calculation may be performed by the processor faster than executing a multiple cycle ("for" loop) each having a single calculation. In some embodiments, the resource optimizer may initiate a third optimization by instructing a general-purpose GPU (GPGPU), or other type of parallel processor, to perform this computation. For example, as there is a computation performed which involves two identical GMM components, it may be advantageous to perform a computation between each MFCC matrix (which are different from one another) and the GMM data structures (which are the same for multiple MFCC Matrices) in parallel threads.

In a further embodiment, the resource optimizer may initiate a fourth optimization. The fourth optimization includes identifying all intermediate matrix results that need to be diagonalized, and eliminating the computation of all off-diagonal elements. By eliminating the computation of off-diagonal matrix elements, the resource optimizer allows the processor to reduce computation cycles while simultaneously saving memory space by not storing results of computations which would not factor in to the end result in an impactful way.

In a further embodiment, the resource optimizer may initiate a fifth optimization, which includes detecting common precomputable elements in the required computations between GMM data structures and the MFCC matrix. The resource optimizer may detect a recurring computation and generate a precomputed value for such recurring computations. The precomputed value may be stored, e.g., in a storage, for future reference. For example, a recurring computation can occur within a loop. By detecting such recurring computations (and for example storing them in a processor cache), generating a product outside of the loop and using the product within the loop, the processor performs less calculations per loop cycle, thereby reducing computation and decreasing total processing time. In certain embodiments, the resource optimizer may perform any one or more of the optimizations.

Figure 5:
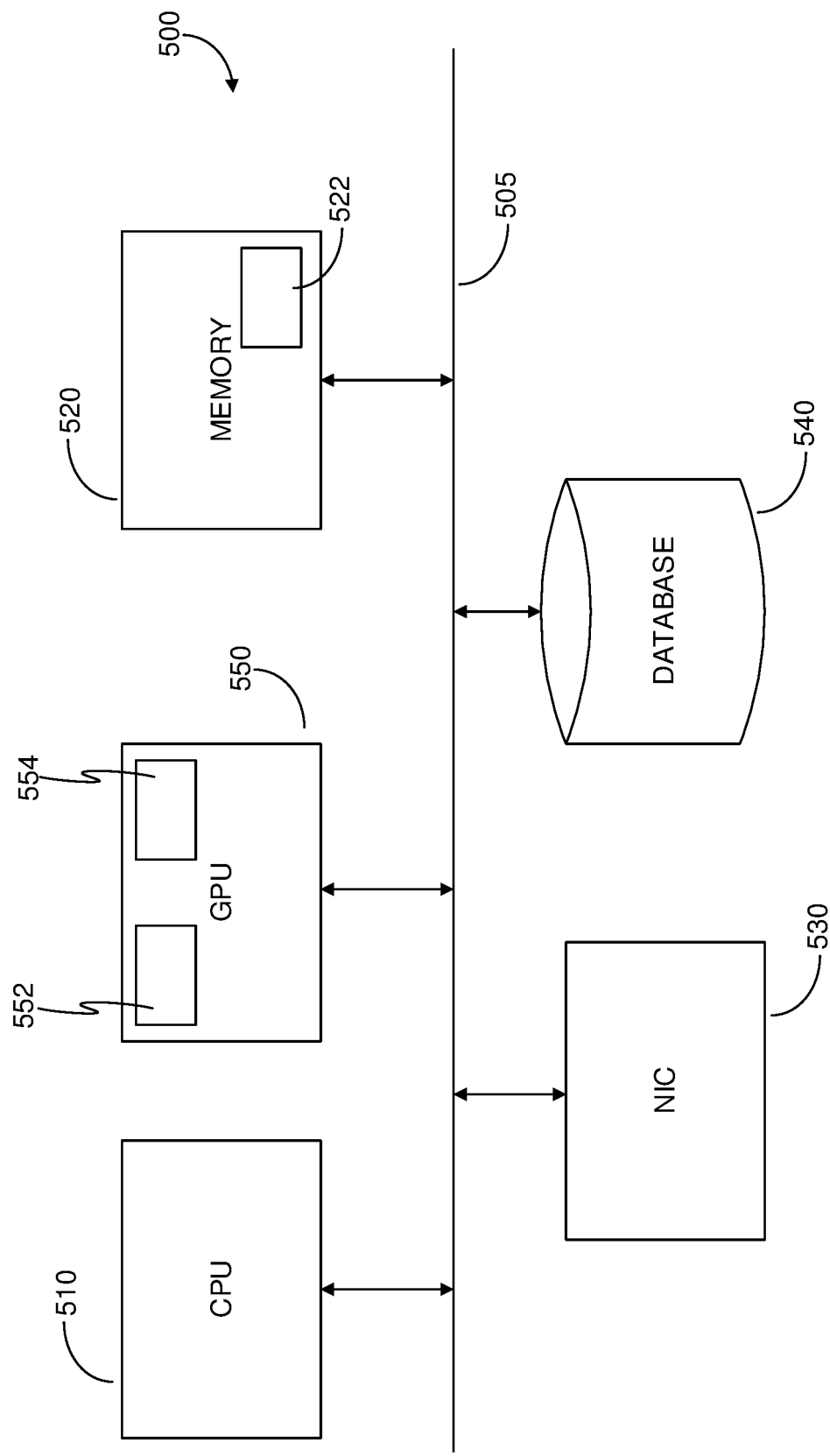
FIG. 5 is an example block diagram of a UBM Training System implemented according to an embodiment.

FIG. 5 is an example block diagram of a UBM Training System 500 implemented according to an embodiment. The system 500 includes at least one processing circuitry 510, for example, a central processing unit (CPU). In an embodiment, the processing circuitry 510 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 510 is coupled via a bus 505 to a memory 520. The memory 520 may include a memory portion 522 that contains instructions that when executed by the processing circuitry 510 performs the method described in more detail herein. The memory 520 may be further used as a working scratch pad for the processing circuitry 510, a temporary storage, and others, as the case may be. The memory 520 may be a volatile memory such as, but not limited to random access memory (RAM), or non-volatile memory (NVM), such as, but not limited to, flash memory.

The processing circuitry 510 may be further connected to a network interface controller 530, which provides the system 500 with connectivity to a network. The network may provide connectivity to various devices, such as a speaker database, feature extractor, and the like. In some embodiments, the speaker database, feature extractor and UBM training system may be implemented on a single machine. In an embodiment, the network may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The processing circuitry 510 may be further connected to a database 540. The database 540 may be used for the purpose of holding a copy of the method executed in accordance with the disclosed technique. The database 540 may also store therein a plurality of GMM components. In some embodiments, the system 500 includes a storage (not shown) for storing thereon audio recordings, as part of a speaker database.

The bus 505 may further connect a general-purpose graphics processing unit (GPGPU) 550. The GPGPU 550 may include a plurality of computational cores, such as first core 552 and second core 554. The processing circuitry 510, the GPGPU 550, and/or the memory 520 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 6:
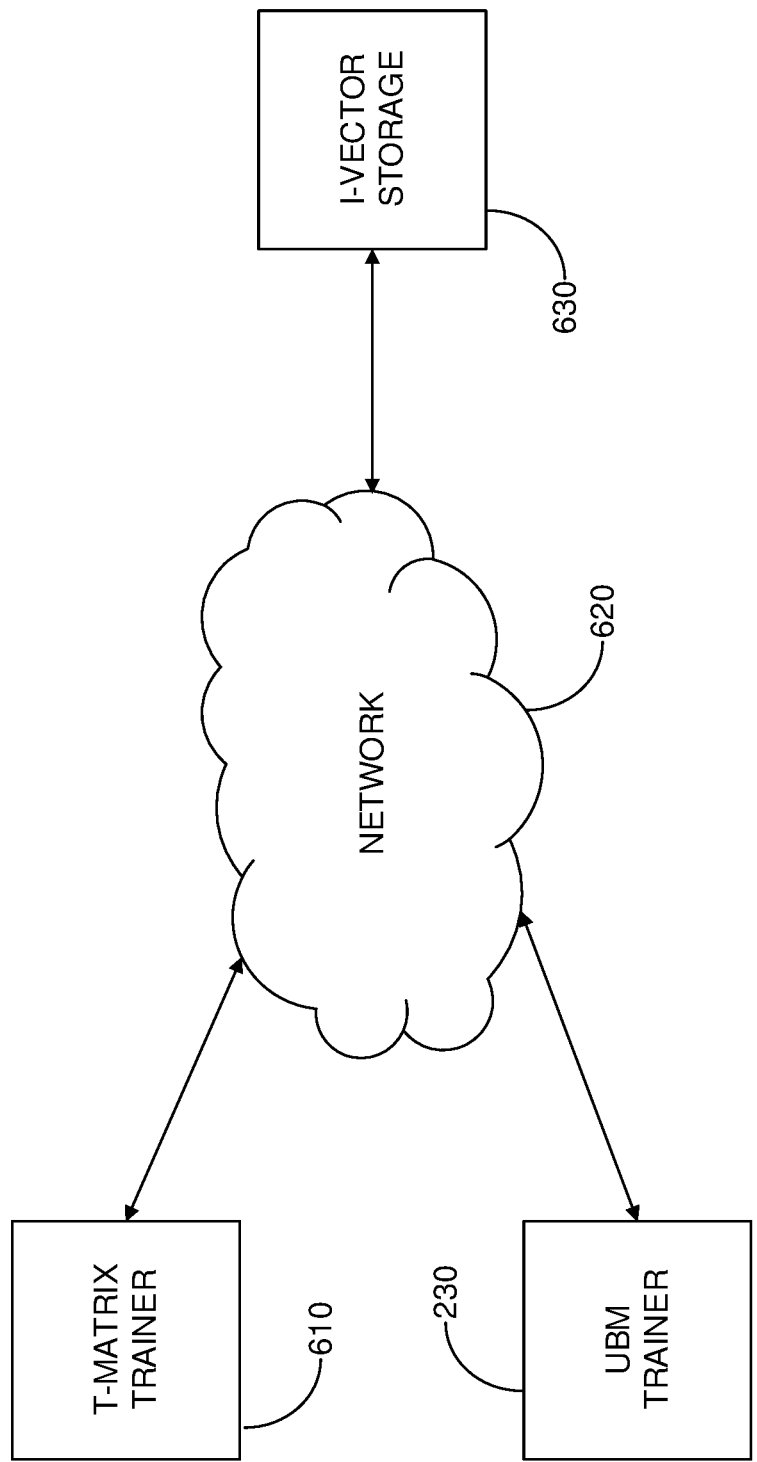
FIG. 6 is a schematic illustration of a speaker recognition training system based on a UBM according to an embodiment.

FIG. 6 is an example schematic illustration of a speaker recognition training system based on a UBM according to an embodiment. One example method of speaker recognition involves joint factor analysis (JFA). Based on such a JFA model, a speaker can be represented by a GMM which can be decomposed as:

$$s=m+Vy+Ux+Dz$$

where s is a speaker supervector, m is a speaker independent supervector (typically derived from the UBM), V is an eigenvoice matrix, y is a vector of speaker dependent factors, U is an eigenchannel matrix, x is a vector of channel dependent factors, D is a residual matrix, and z is a vector of speaker specific residual factors. One of ordinary skill would be familiar with the definitions and utilizations of eigenvoice matrix and eigenchannel matrix.

In this embodiment, the eigenvectors represented by each matrix V, U, and D can be thought of as being combined by speaker and/or channel dependent components y, x, and z respectively. Studies have found that the channel dependent factors may also contain speaker dependent information. Another approach to the JFA model is therefore:

$$s=m+Tw$$

where, s is the speaker supervector, m is the speaker independent supervector, T is the total variability matrix, and w represents a vector containing the total factors, also known as 'Identity Vector' or i-vector. Each total factor in an i-vector controls an eigen-dimension of the T-matrix.

A T-matrix needs to be trained, for example, by a T-matrix trainer 610. The T-matrix trainer 610 may be communicatively coupled via a network 620 to a UBM trainer 230, and a speaker database (e.g., database 210, FIG. 2). It should be noted that the T-matrix training requires a trained UBM, which may be performed by the methods detailed above. The T-matrix trainer may also be communicatively coupled with an i-vector storage 630, having stored therein a plurality of i-vectors. A method of utilizing the T-matrix trainer 610 is discussed in more detail in FIG. 7.

In an embodiment, the network 620 may be configured to provide connectivity of various sorts, as may be necessary, including but not limited to: wired and/or wireless connectivity, including, for example, local area network (LAN), wide area network (WAN), metro area network (MAN), worldwide web (WWW), Internet, computer telephony integration (CTI) systems, and any combination thereof, as well as cellular connectivity. The i-vector storage 630 is operative for receiving an audio input which includes one or more human speakers, extracting therefrom speaker features, such as MFC coefficients, and generating an i-vector based on the MFC coefficients and a trained UBM.

Figure 7:
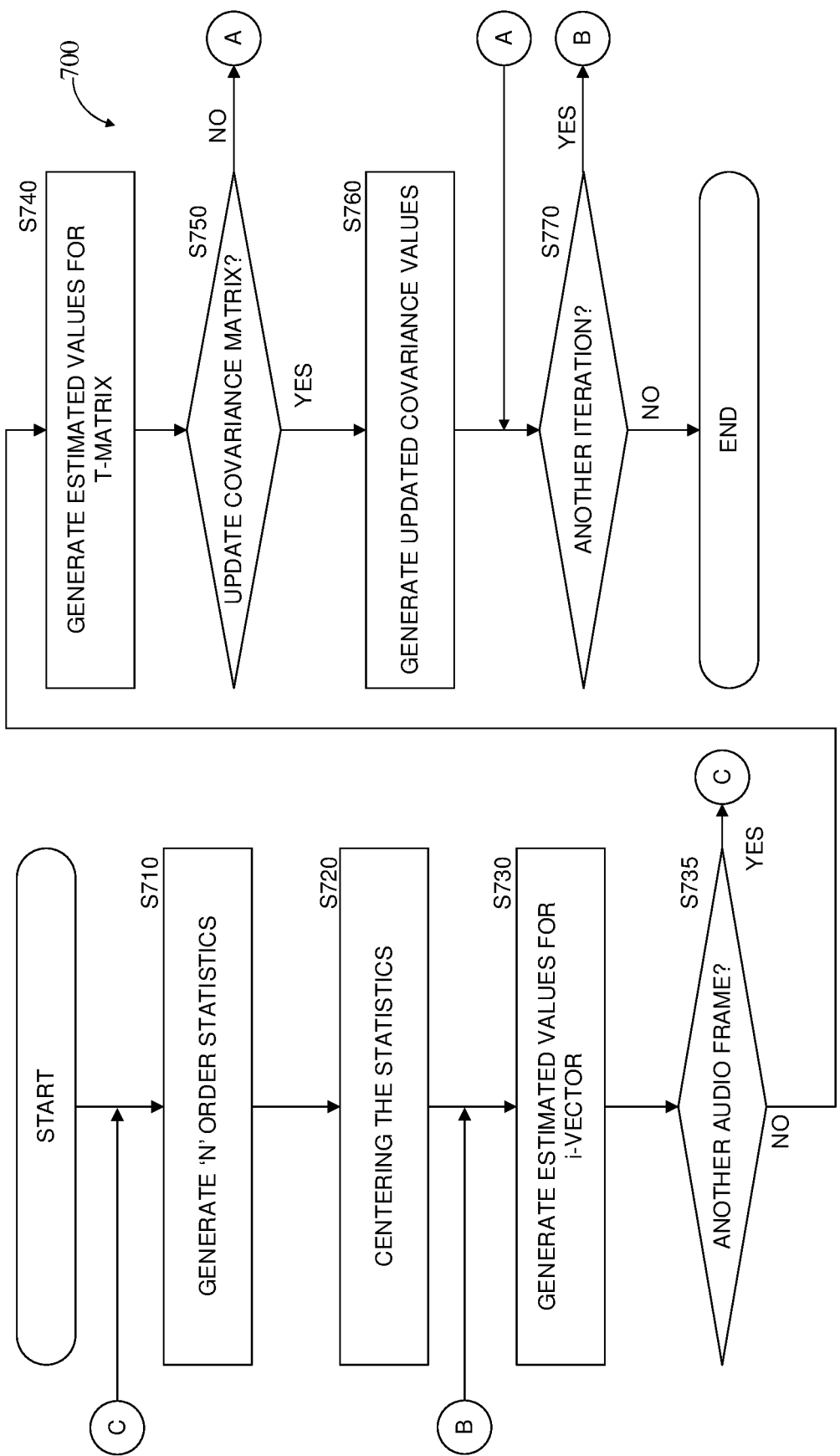
FIG. 7 is a flowchart of a method for training a T-matrix speaker recognition system according to an embodiment.

FIG. 7 is an example flowchart 700 of a method for training a T-matrix speaker recognition system according to an embodiment. For audio data from speaker s containing multiple audio frames t, the T-matrix trainer 610 should first generate 'n$^{th}$' order statistics (where 'n' is greater than or equal to 2), at S710.

For example, the T-matrix trainer 610 may generate three orders (n=3) of Baum Welch Statistics by performing the following equation:

$$0^{th} \text{ order: } N_c(s)=\Sigma_{t \in s}\gamma_t(c)$$

where $\gamma_t(c)$ is the posterior of Gaussian component c of a GMM for observation t (e.g. MFCC's for audio frame t) of speaker s, $$1^{st} \text{ order: } F_c(s)=\Sigma_{t \in s}\gamma_t(c)Y_t$$

where $Y_t$ is a feature vector representing observation t (e.g. MFCCs for frame t);

$$2^{nd} \text{ order: } S_c(s)=\text{diag}(\Sigma_{t \in s}\gamma_t(c)Y_tY_t^*)$$

and where $Y_t^*$ is a Hermitian transposition of $Y_t$. Generating the statistics may be performed, in an embodiment, by iterating over multiple audio frames.

At S720, centering of the statistics is performed, for example, by the T-matrix trainer. In this example embodiment, the centering may be performed by configuring the processor to compute the following:

$$\tilde{F}_c(s)=F_c(s)-N_c(s)m_c$$

where $m_c$ is the mean for UBM component c, and $$\tilde{S}_c(s)=S_c(s)-\text{diag}(F_c(s)m_c^*+m_cF_c(s)^*-N_c(s)m_cm_c^*)$$

which is the centered 2$^{nd}$ order statistic.

At S730, an estimate of the total factors w (or i-vector) is generated. The estimated value may be generated by:

$$\bar{w}(s)=l_T^{-1}(s)*T^{**}\Sigma^{-1}*FF(s)$$

where $$l_T(s)=I+T^{**}\Sigma^{-1}*NN(s)*T$$

and where $\Sigma^{-1}$ is the inverse of the UBM covariance matrix.

In an embodiment, the matrix T may be initialized with random values and with a final matrix computed within a predefined number of iterations. In some embodiments, FF(s) may be generated by stacking the centered first order statistics into a vector data structure. Likewise, in certain embodiments NN(s) may be generated by replicating each element of $N_c(s)$ by the number of the dimension of the feature vector to generate an element group, stacking each element group into a vector data structure, and using this vector data structure as the diagonal content of a diagonal matrix.

A resource optimizer, discussed in more detail below, may select an optimization scheme to generate $l_T(s)$ by performing an element by element operation between a vector containing the diagonal elements of NN(s) and each column of T. This computation is more efficient and consumes less memory.

In certain embodiments, the generation of $l_T(s)$ can be executed in parallel. It should be noted that element outcomes do not affect each other and can therefore be calculated independently. It should be further noted that disclosed optimization allows the calculation to be performed on an end device (such as a mobile phone) which has relatively low computing power and less available memory, when compared, for example, to a server.

At S735 a check is performed to determine if another audio frame (or another recording, in some embodiments) should be processed. If 'yes', execution returns to at S710, otherwise execution continues at S740.

At S740 an estimate is generated for the T-matrix by the T-matrix trainer. The T-matrix trainer may compute the following:

$$T = \begin{bmatrix} T_1 \\ \vdots \\ T_c \end{bmatrix} = \begin{bmatrix} C_1 * A_1^{-1} \\ \vdots \\ C_C * A_C^{-1} \end{bmatrix}$$

where $T_1$ through $T_c$ are block matrix components of T corresponding to each GMM component, and $C_1$ through $C_c$ are block matrix components of C corresponding to each GMM component. Further, the following notation is useful:

$$N_c = \sum_s N_c(s)$$

$$A_c = \sum_s N_c(s)(l_T^{-1}(s) + w(s) * w'(s))$$

$$C = \sum_s FF(s) * (l_T^{-1}(s) * T^* * \Sigma^{-1} * FF(s))^*$$

$$NN = \sum_s NN(s)$$

At S750 a check is performed if the covariance matrix should be updated. If 'yes' execution continues at S760, otherwise execution continues at S770.

At S760, values are generated for the covariance matrix, for example, by computing the following:

$$\Sigma = NN^{-1}\left(\left(\sum_s SS(s)\right) - \text{diag}(C * T^*)\right)$$

where SS(s) is generated by stacking the second order statistics into a vector data structure and using this vector data structure as the diagonal content of a diagonal matrix.

At S770 a check is performed to determine if another iteration should be performed. If 'yes', execution continues at S730, otherwise execution terminates.

According to some embodiments disclosed herein, in the T-Matrix trainer may include a T-matrix resource optimizer. This would allow to save on computational resources.

A resource optimizer may initiate a first optimization by instructing the processor to generate any product of the covariance matrix (e.g. multiplying the delta matrix and inverse covariance matrix), by eliminating the diagonal covariance matrix data structure. Rather than instructing a processor of the T-matrix trainer to process the product of two matrixes in a naïve manner, the resource optimizer may instruct the processor to only compute those values where the diagonal elements of the covariance matrix are involved. Thus, the processor avoids performing a plurality of calculations which would merely yield a zero result. By avoiding processing these data values, the T-matrix trainer uses less processor resources, and thus less memory is required to generate intermediate computations and store results, as only meaningful (e.g. non-zero) results are stored.

In some embodiments, the resource optimizer may initiate a second optimization. In an embodiment, the second optimization may include generating new data structures, such data structures comprising a plurality of GMM components, also referred to as a multi-dimensional data array. The multi-dimensional data arrays may include two or more of the GMM components. Such data structures may be of a data size of 'n' by '1' for GMM weights, and 'n' by 'D' for GMM means and covariances, where 'n' is an integer equal to the number of GMM components, and 'D' is an integer equal to the number of coefficients in each MFCC frame. The resource optimizer may then instruct the processor to execute necessary computations between the multi-dimensional data arrays, and a MFCC matrix generated by replicating the current MFCC vector (relating to a single audio frame) in a 'n' by 'D' matrix. In certain computing environments, this single cycle calculation may be performed by the processor faster than executing a multiple cycles ("for" loop) each having a single calculation.

In some embodiments, the resource optimizer may initiate a third optimization by instructing a general purpose GPU (GPGPU), or other type of parallel processor, to perform this computation. For example, as there is a computation performed which involves two identical GMM components, it may be advantageous to perform a computation between each MFCC matrix (which are different from one another) and the GMM data structures (which are the same for multiple MFCC Matrices) in parallel threads.

In yet another embodiment, the resource optimizer may initiate a fourth optimization. The fourth optimization includes identifying all intermediate matrix results that need to be diagonalized, and eliminating the computation of all off-diagonal elements. By eliminating the computation of off-diagonal matrix elements, the resource optimizer allows the processor to reduce computation cycles, while simultaneously saving memory space by not storing results of computations which would not factor in to the end result in an impactful way.

In yet another embodiment, the resource optimizer may initiate a fifth optimization, which includes detecting common precomputable elements in the required computations between GMM data structures and the MFCC matrix. The resource optimizer may detect a recurring computation, and generate a precomputed value for such recurring computations. For example, a recurring computation can occur within a loop. By detecting such recurring computations (and for example storing them in a processor cache), generating a product outside of the loop and using the product within the loop, the processor performs less calculations per loop cycle, thereby reducing computation and decreasing total processing time.

In other embodiments, the resource optimizer may initiate a sixth optimization, which includes detecting a processor output generated by performing a computation between a first matrix (such as an MFCC matrix) and a second matrix (such as UBM mixture components) and generating the output by performing an element by element operation between the two matrices (or between a vector and matrix, where applicable).

In certain embodiments, the resource optimizer may perform any one or more of the above-mentioned optimizations.

Figure 8:
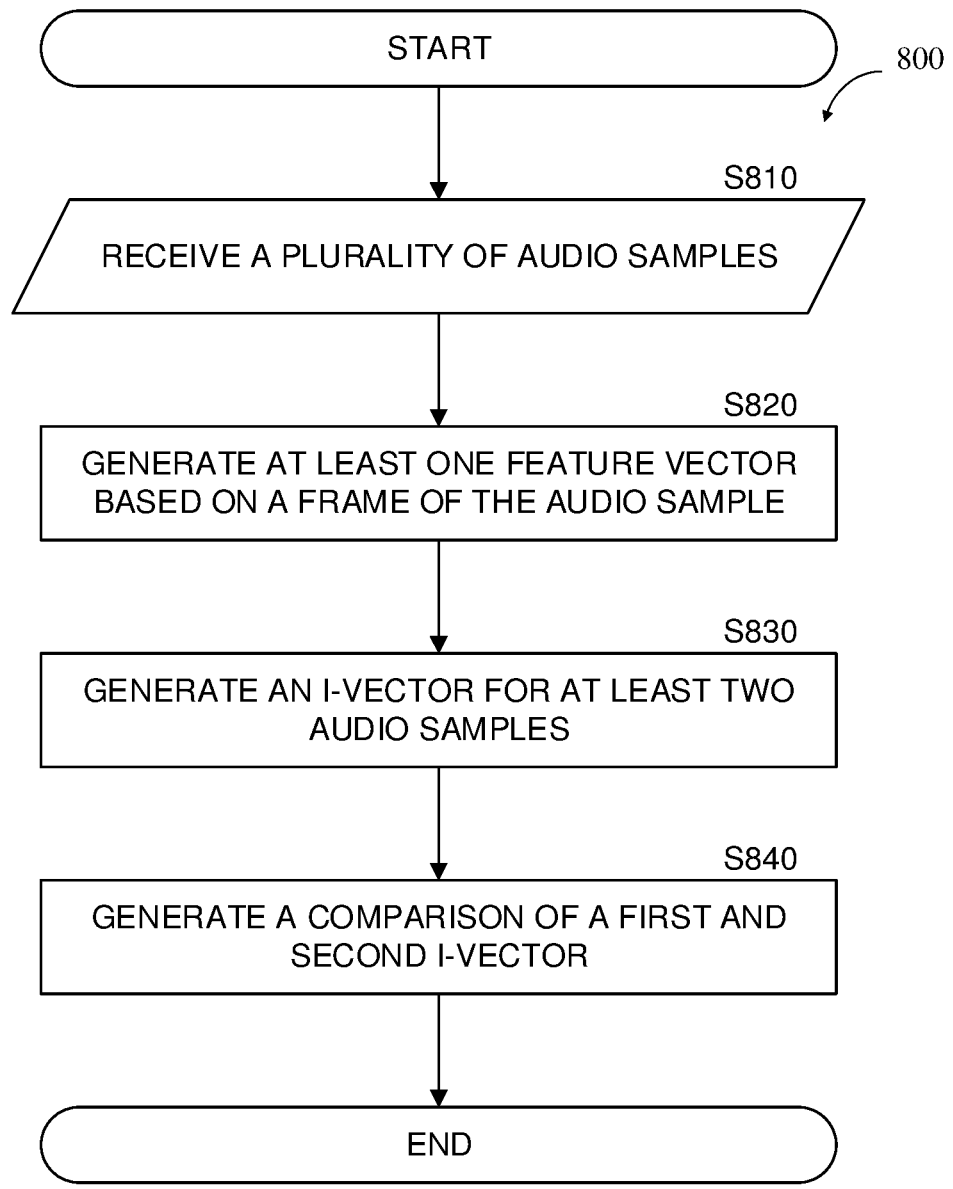
FIG. 8 is a flowchart of a method for determining an i-vector match between a first and second speaker according to an embodiment.

FIG. 8 is an example flowchart 800 of a method for determining an i-vector match between a first and second speaker.

At S810 a plurality of audio samples is received: each audio sample including a human speaker.

At S820, at least one feature vector is generated based on at least one frame of each audio sample, including therein a sample of a human speaker.

At S830, an i-vector is generated per audio sample, based on the UBM, the T-matrix and at least one feature vector from that audio sample, for example as detailed in FIG. 7 above, and in particular with respect to S730. In some embodiments it may be useful to perform channel compensation on the i-vectors. This can be performed by techniques known in the art, such as LDA (linear discriminant analysis) and WCCN (within-class covariance normalization).

At S840, a score is generated between a first i-vector and second i-vector of the plurality of i-vectors. The score may be generated for example by computing the following:

$$\text{score}(w_1 w_2) = \frac{w_1^* * w_2}{\|w_1\| * \|w_2\|}$$

which is a cosine distance score. A higher score ('1' being highest) indicates the i-vectors are highly correlated to the same speaker, whereas a lower score ('−1' being lowest) indicates that two i-vectors are probably generated from different speakers.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for improving T-matrix training for speaker recognition, comprising:
   receiving an audio input, divisible into a plurality of audio frames, wherein at least a first audio frame includes an audio sample of a human speaker, the sample having a length above a first threshold;
   generating for each audio frame a feature vector;
   generating for a first plurality of feature vectors centered statistics of at least a zero order and a first order;
   generating a first i-vector, the first i-vector representing the human speaker;
   generating an optimized T-matrix training sequence computation, based on the first i-vector, an initialized T-matrix, the centered statistics, and a Gaussian Mixture Model (GMM) of a trained universal background model (UBM), wherein the GMM is associated with a plurality of components, each defined by a covariance matrix, a mean vector, and a weight, and wherein generating the optimized T-matrix training sequence further comprises:
   generating a feature matrix based on the feature vector;
   generating a GMM mean matrix based on the plurality of mean vectors associated with the plurality of GMM components; and
   generating a delta matrix based on the feature matrix and the GMM mean matrix.

2. The method of claim 1, wherein generating the optimized T-matrix training sequence further comprises:
   generating a first multi-dimensional array comprising a plurality of duplicated matrices, wherein each matrix includes a plurality of GMM mean vectors;
   generating a multi-dimensional feature matrix, comprising a plurality of feature matrices, wherein each feature matrix corresponding to a feature vector of a single audio frame; and
   generating a multi-dimensional delta array based on the first multi-dimensional array and the multi-dimensional feature matrix.

3. The method of claim 1, wherein generating the optimized T-matrix training sequence further comprises:
   detecting diagonal matrices, and performing only those computations that involve diagonal elements.

4. The method of claim 1, wherein generating the optimized T-matrix training sequence further comprises:
   detecting computations in an intermediate result that generate an off diagonal element of a matrix which is diagonalized; and
   eliminating the computation of the intermediate result.

5. The method of claim 1, wherein generating the optimized T-matrix training sequence further comprises:
   detecting a recurring computation; and
   precomputing the recurring computation and storing the precomputed result in a cache of the processor.

6. The method of claim 1, wherein generating the optimized T-matrix training sequence further comprises:
   detecting a computation between a first matrix and a second matrix; and
   replacing the detected computation with an element by element computation between the first matrix and the second matrix, in response to determining that the replacement will result in the same output.

7. The method of claim 1, wherein a plurality of i-vectors are generated, wherein each i-vector corresponding to a single human speaker.

8. The method of claim 7, wherein a first group of the plurality of i-vectors are generated from a first audio input, and a second group is generated from a second audio input.

9. The method of claim 1, repeating the method for a plurality of iterations based on a single audio frame.

10. The method of claim 1, repeating the method for each of the plurality of audio frames.

11. The method of claim 1, wherein the method is performed in multiple iterations on each audio frame.

12. The method of claim 1, wherein the feature vector is an MFCC vector.

13. The method of claim 1, executing the optimized T-matrix training sequence on any one of: a general purpose graphics processor unit (GPGPU), a multi-core CPU, and a combination GPGPU and multi-core CPU.

14. A non-transitory computer readable medium having stored thereon instructions for causing a processing circuitry to execute a process, the process comprising:
    receiving an audio input, divisible into a plurality of audio frames, wherein at least a first audio frame includes an audio sample of a human speaker, the sample having a length above a first threshold;
    generating for each audio frame a feature vector;
    generating for a first plurality of feature vectors centered statistics of at least a zero order and a first order;
    generating a first i-vector, the first i-vector representing the human speaker;
    generating an optimized T-matrix training sequence computation, based on the first i-vector, an initialized T-matrix, the centered statistics, and a Gaussian mixture model (GMM) of a trained universal background model (UBM), wherein the GMM is associated with a plurality of components, each defined by a covariance matrix, a mean vector, and a weight, and wherein generating the optimized T-matrix training sequence further comprises:
    generating a feature matrix based on the feature vector;
    generating a GMM mean matrix based on the plurality of mean vectors associated with the plurality of GMM components; and
    generating a delta matrix based on the feature matrix and the GMM mean matrix.

15. A system for improving T-matrix training for speaker recognition, comprising:
    a processing circuitry; and
    a memory, the memory containing instructions that, when executed by the processing circuitry, configure the system to:
    receive an audio input, divisible into a plurality of audio frames, wherein at least a first audio frame includes an audio sample of a human speaker, the sample having a length above a first threshold;
    generate for each audio frame a feature vector;
    generate for a first plurality of feature vectors centered statistics of at least a zero order and a first order;
    generate a first i-vector, the first i-vector representing the human speaker;
    generate an optimized T-matrix training sequence computation, based on the first i-vector, an initialized T-matrix, the centered statistics, and a Gaussian mixture model (GMM) of a trained universal background model (UBM), wherein the GMM is associated with a plurality of components, each defined by a covariance matrix, a mean vector, and a weight, and wherein the system is further configured to:
    generate a feature matrix based on the feature vector;
    generate a GMM mean matrix based on the plurality of mean vectors associated with the plurality of GMM components; and
    generate a delta matrix based on the feature matrix and the GMM mean matrix.

* * * * *